July 31, 1962     R. W. BURTON ETAL     3,047,345
DRIVE SHAFT BEARING SUPPORT
Filed Nov. 14, 1960
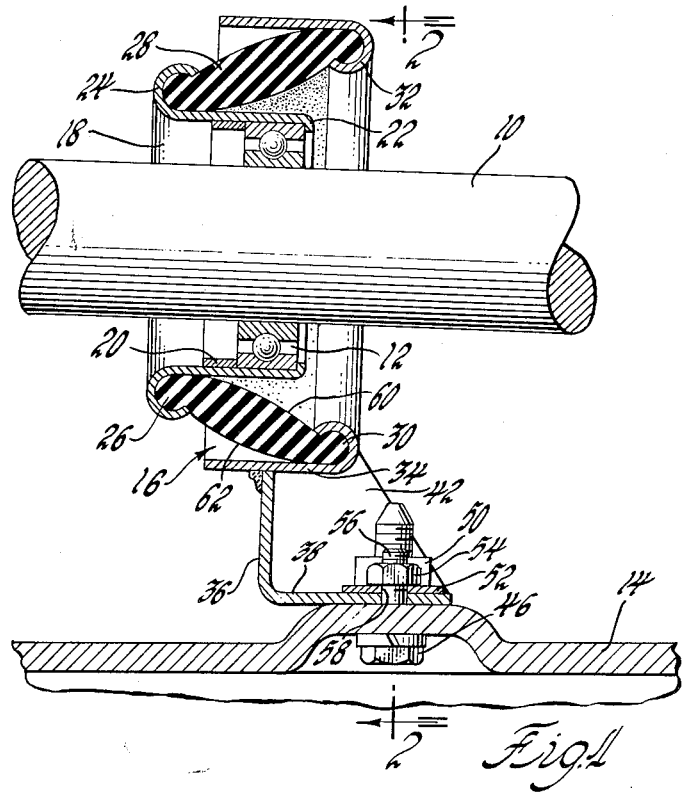
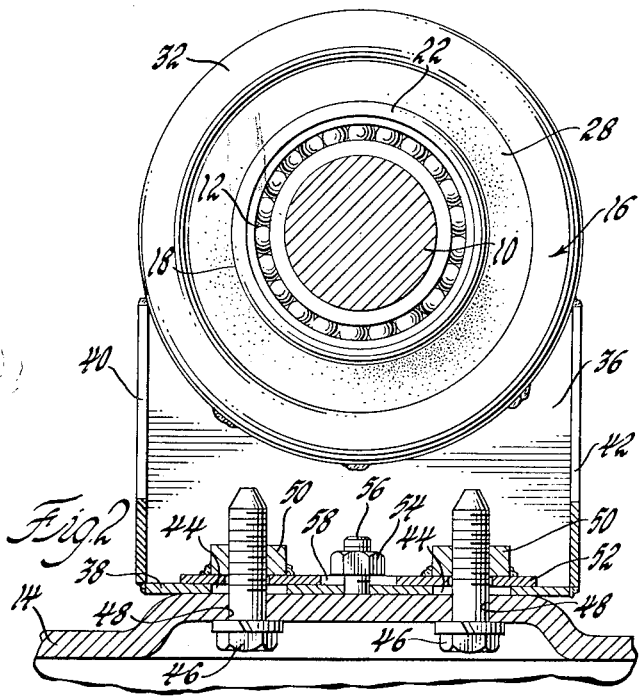
INVENTORS
Robert W. Burton &
BY Edward Sich
E. E. James
ATTORNEY

3,047,345
DRIVE SHAFT BEARING SUPPORT
Robert W. Burton, Farmington, and Edward Sich, St. Clair Shores, Mich., assignors to General Motors Corporation, Detroit, Mich., a corporation of Delaware
Filed Nov. 14, 1960, Ser. No. 68,742
5 Claims. (Cl. 308—28)

This invention relates generally to bearing support means and more particularly to a vibration isolating mount for a bearing member supporting the drive shaft of an automotive vehicle.

The dynamic forces acting upon the drive shaft of an automotive vehicle tend to transmit vibrations and road noises through a center bearing and its support to the vehicle body. These vibrations and noises are best isolated from the vehicle body by the use of a relatively soft resilient mount radially supporting and centering the drive shaft bearing with respect to the vehicle frame or underbody.

The invention contemplates an improved bearing support of the type described which is relatively simple and inexpensive to manufacture, which provides variable rate rebound characteristics effectively isolating vibrations and road noises from the vehicle body; and which provides a resilient bumper stop preventing excessive shaft deflection. The invention further contemplates an improved bearing support mounting assembly facilitating the mounting of the bearing support means within the normally inaccessible center section of the vehicle frame.

The foregoing and other objects, advantages and features of the invention will be more thoroughly understood from the following description of the preferred illustrative embodiment thereof having reference to the accompanying drawing, in which:

FIGURE 1 is a cut-away section of a vehicle frame showing the drive shaft bearing support means of the invention; and FIGURE 2 is a sectional view taken substantially in the plane of the line indicated at 2—2 of FIGURE 1 and shows the bearing support of FIGURE 1 partially in end elevation and partially in section through its mounting on the vehicle underframe.

Referring more particularly to the drawing, a vehicle drive or propeller shaft 10 is journaled intermediate its ends by a ball bearing assembly 12. The inner race of the ball bearing assembly is suitably secured or mounted on the drive shaft for rotation therewith and the outer race of the ball bearing is resiliently mounted with respect to a vehicle frame or underbody member 14 by a bearing supporting device 16 embodying the invention.

The bearing supporting device 16 includes an inner sleeve member 18. In assembly, the inner sleeve embraces the outer bearing race and is maintained in non-rotatable relation thereto by a suitable retaining ring 20 which maintains the outer bearing race in end abutment with a flange 22 extending radially inwardly of one end of the sleeve member 18. The opposite end of the inner sleeve is secured by means of a rolled-over flange 24 to an annularly beaded end 26 of a resilient sleeve member 28. This resilient member is in the form of a frustum of an oblique cone and extends longitudinally and radially outwardly from its inner beaded end in spaced embracing relation to the shaft, the ball bearing and the inner sleeve. The opposite outer end of the resilient member is provided with a second annular bead 30. This outer bead is secured by a rolled-over flange 32 to one end of an outer sleeve member 34 which extends longitudinally therefrom in spaced embracing relation to the shaft, the bearing and the inner sleeve member.

The outer sleeve 34 is secured to the vehicle frame member 14 by a flanged bracket member 36. The bracket member 36 is provided with a bottom flange 38 extending laterally between two side flanges 40 and 42. This bottom flange is provided with two laterally spaced slots 44. In assembly of the bearing support of the vehicle frame, the slots 44 embrace two mounting bolts 46 which extend upwardly through bolt holes 48 provided in the vehicle frame member 14. The bolts 46 threadably engage two nuts 50 which are secured to and structurally interconnected by a plate member 52. Prior to installation of the drive shaft and bearing supporting assembly in the motor vehicle, the nut carrying plate 52 is slidably mounted on the bottom flange of the bracket member by a nut 54 and a bolt 56 which is carried by and extends upwardly from the bottom flange through a laterally extending slot 58 provided in the plate member. The relative lateral movement permitted by the slots 44 and 58 of the support bracket and nut carrying plate, respectively, permits shaft centering accommodation of bearing supporting device prior to tightening bolts 46.

As shown in FIGURE 1, the inner and outer surfaces 60 and 62 of the resilient sleeve member 28 between the flange secured beaded ends thereof are preferably convex inwardly and outwardly, respectively. This preferred configuration of the resilient member provides variable deflection rate characteristics due to the rolling action provided between the resilient member and the inner and outer sleeves 18 and 34 and due to variations in the effective arm lengths of the rubber cone as a result of lateral, longitudinal and torsional shaft deflections under vehicle operating conditions. The intermediate portion of the sleeve member 28 further serves as an initially soft variable rate bumper or stop preventing excessive deflection of the drive shaft under certain road and torque load conditions.

While only one specific embodiment of the invention has been shown and described for the purpose of illustration, it will be appreciated that various modifications may be made without departing from the spirit and scope of the invention as defined in the following claims.

We claim:

1. A vehicle drive shaft center bearing support and vibration isolating means comprising a first cylindrical member adapted to be secured to a vehicle underbody frame member and to receive a vehicle drive shaft therethrough, a second cylindrical shaft receiving member spacedly embraced by said first cylindrical member, and a resilient annular sleeve member in the form of a frustum of an oblique cone interposed between and secured at opposite ends thereof to said first and second cylindrical members, said resilient sleeve member having convex inner and outer surfaces intermediate the secured end portions thereof and being adapted to provide variable deflection rate characteristics due to rolling action between said resilient and cylindrical members and variations in the deflective arm lengths of the resilient member as a result of lateral, longitudinal and torsional shaft deflections under vehicle operating conditions, the intermediate portion of the resilient sleeve member further serving as an initially soft variable stop bumper between said first and second cylindrical members thereby preventing excessive deflection of the drive shaft under certain road and torque load conditions.

2. A vehicle drive shaft center bearing support and vibration isolating means comprising a first cylindrical member adapted to be secured to an underbody frame member of a vehicle and to receive a vehicle drive shaft therethrough, a second cylindrical member journaled on said shaft and spacedly embraced by said first cylindrical member, and a resilient annular sleeve member in the form of a frustum of an oblique cone interposed between and secured at opposite ends thereof to said first and second cylindrical members, said resilient sleeve member being adapted to provide variable deflection rate characteristics due to variations in the effective arm lengths of the resilient member as a result of lateral, longitudinal and torsional shaft deflections under vehicle operating conditions.

3. In a vehicle drive shaft center bearing support and vibration isolating means as set forth in claim 2, the intermediate portion of the resilient sleeve member further serving as a stop bumper between said first and second cylindrical members thereby preventing excessive deflection of the drive shaft under certain road and torque load conditions.

4. In a vehicle drive shaft center bearing support and vibration isolating means as set forth in claim 2, bracket means for adjustably securing said first cylindrical member to the vehicle underbody frame member for lateral movement with respect to the vehicle drive shaft.

5. A vehicle drive shaft center bearing support and vibration isolating means comprising a first cylindrical member adapted to be secured to an underbody frame member of a vehicle and to receive a vehicle drive shaft therethrough, a second cylindrical member journaled on said shaft and spacedly embraced by said first cylindrical member, and a resilient frusto-conical member interposed between and secured at opposite ends thereof to said first and second cylindrical members, said resilient sleeve member having convex inner and outer surface intermediate the secured end portions thereof and being adapted to provide variable deflection rate characteristics due to rolling action between the resilient and cylindrical members and variations in the effective arm lengths of the resilient member as a result of lateral, longitudinal and torsional shaft deflections under vehicle operating conditions.

References Cited in the file of this patent

UNITED STATES PATENTS

| | | |
|---|---|---|
| 2,575,858 | Bennett | Nov. 20, 1951 |
| 2,930,660 | Dunn | Mar. 29, 1960 |
| 2,939,748 | Leach | June 7, 1960 |

FOREIGN PATENTS

| | | |
|---|---|---|
| 142,332 | Sweden | Sept. 29, 1953 |